US010063931B2

United States Patent
Bi et al.

(10) Patent No.: US 10,063,931 B2
(45) Date of Patent: *Aug. 28, 2018

(54) SYSTEM AND METHOD FOR PROVIDING RECOMMENDATION ICONS ON AN ELECTRONIC PROGRAMMING GUIDE

(71) Applicant: AT&T INTELLECTUAL PROPERTY I, L.P., Atlanta, GA (US)

(72) Inventors: Haifeng Bi, San Antonio, TX (US); Xiaolian Bi, San Antonio, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/415,009

(22) Filed: Jan. 25, 2017

(65) Prior Publication Data
US 2017/0134818 A1 May 11, 2017

Related U.S. Application Data

(63) Continuation of application No. 14/530,062, filed on Oct. 31, 2014, which is a continuation of application
(Continued)

(51) Int. Cl.
*H04N 21/23* (2011.01)
*H04N 21/482* (2011.01)
(Continued)

(52) U.S. Cl.
CPC ..... *H04N 21/4826* (2013.01); *H04N 21/4312* (2013.01); *H04N 21/4532* (2013.01);
(Continued)

(58) Field of Classification Search
CPC ......... H04N 21/4826; H04N 21/25891; H04N 21/4316; H04N 21/44543
See application file for complete search history.

(56) References Cited

U.S. PATENT DOCUMENTS

| 6,774,926 B1 * | 8/2004 | Ellis ............... H04N 5/44543 348/14.01 |
| 2002/0059602 A1 | 5/2002 | Macrae et al. |

(Continued)

OTHER PUBLICATIONS

"TiVo DVR Features, What is Tivo search for and record TV shows on your DVR", http://www.tivo.com/whatistivo/tivodvrfeatures/search_record.html, Jul. 25, 2009, 2 pgs.

*Primary Examiner* — Cai Y Chen
(74) *Attorney, Agent, or Firm* — Guntin & Gust, PLC; Joseph Hrutka

(57) ABSTRACT

Aspects of the subject disclosure may include, for example, a device that receives, from a particular user, identification of selected users from which recommendations are sought. Those users that have made recommendations are determined, and a recommendation is provided to equipment of the particular user for presentation in a graphical user interface. The graphical user interface item is associated with a recommending user and a media content item. A selection of the recommendation graphical user interface item is received, and information is provided for presentation, responsive to a determination that viewing of the information has been authorized. Other embodiments are disclosed.

20 Claims, 10 Drawing Sheets

Related U.S. Application Data

No. 12/550,006, filed on Aug. 28, 2009, now Pat. No. 8,925,014.

(51) Int. Cl.
  *H04N 21/475* (2011.01)
  *H04N 21/61* (2011.01)
  *H04N 21/431* (2011.01)
  *H04N 21/45* (2011.01)
  *H04N 21/6334* (2011.01)

(52) U.S. Cl.
  CPC ..... *H04N 21/4756* (2013.01); *H04N 21/6125* (2013.01); *H04N 21/6175* (2013.01); *H04N 21/6334* (2013.01)

(56) References Cited

U.S. PATENT DOCUMENTS

| | | |
|---|---|---|
| 2005/0102696 A1 | 5/2005 | Westberg |
| 2006/0263041 A1 | 11/2006 | Gustta |
| 2007/0078849 A1 | 4/2007 | Slothouber |
| 2007/0106656 A1 | 5/2007 | Gutta |
| 2007/0136753 A1* | 6/2007 | Bovenschulte ........ H04H 60/31 725/46 |
| 2007/0186243 A1* | 8/2007 | Pettit .................. H04N 5/44543 725/46 |
| 2008/0256579 A1 | 10/2008 | Verhaegh et al. |
| 2014/0208367 A1 | 7/2014 | DeWeese et al. |

* cited by examiner

SYSTEM AND METHOD FOR PROVIDING RECOMMENDATION ICONS ON AN ELECTRONIC PROGRAMMING GUIDE

CROSS-REFERENCE TO RELATED APPLICATIONS

This application is a continuation of and claims priority to U.S. patent application Ser. No. 14/530,062, filed Oct. 31, 2014, which is a continuation of and claims priority to U.S. patent application Ser. No. 12/550,006, filed Aug. 28, 2009, now U.S. Pat. No. 8,925,014. The contents of the foregoing are hereby incorporated by reference into this application as if set forth herein in full.

FIELD OF THE DISCLOSURE

The present disclosure generally relates to communications networks, and more particularly relates to a system and a method for providing recommendation icons on an electronic programming guide.

BACKGROUND OF THE DISCLOSURE

An Internet Protocol television (IPTV) service provider can transmit an IPTV signal to a user via a central office, a serving area interface, and a residential gateway. The IPTV service provider can offer the user a variety of different television programs and/or movies. For example, the IPTV service providers can supply users with real-time television programs that are typically available for the users to watch only at a specific date and time. The IPTV service providers can also offer the users on-demand movies that are available for an extended amount of time and that are provided to the users upon request of the on-demand movie.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
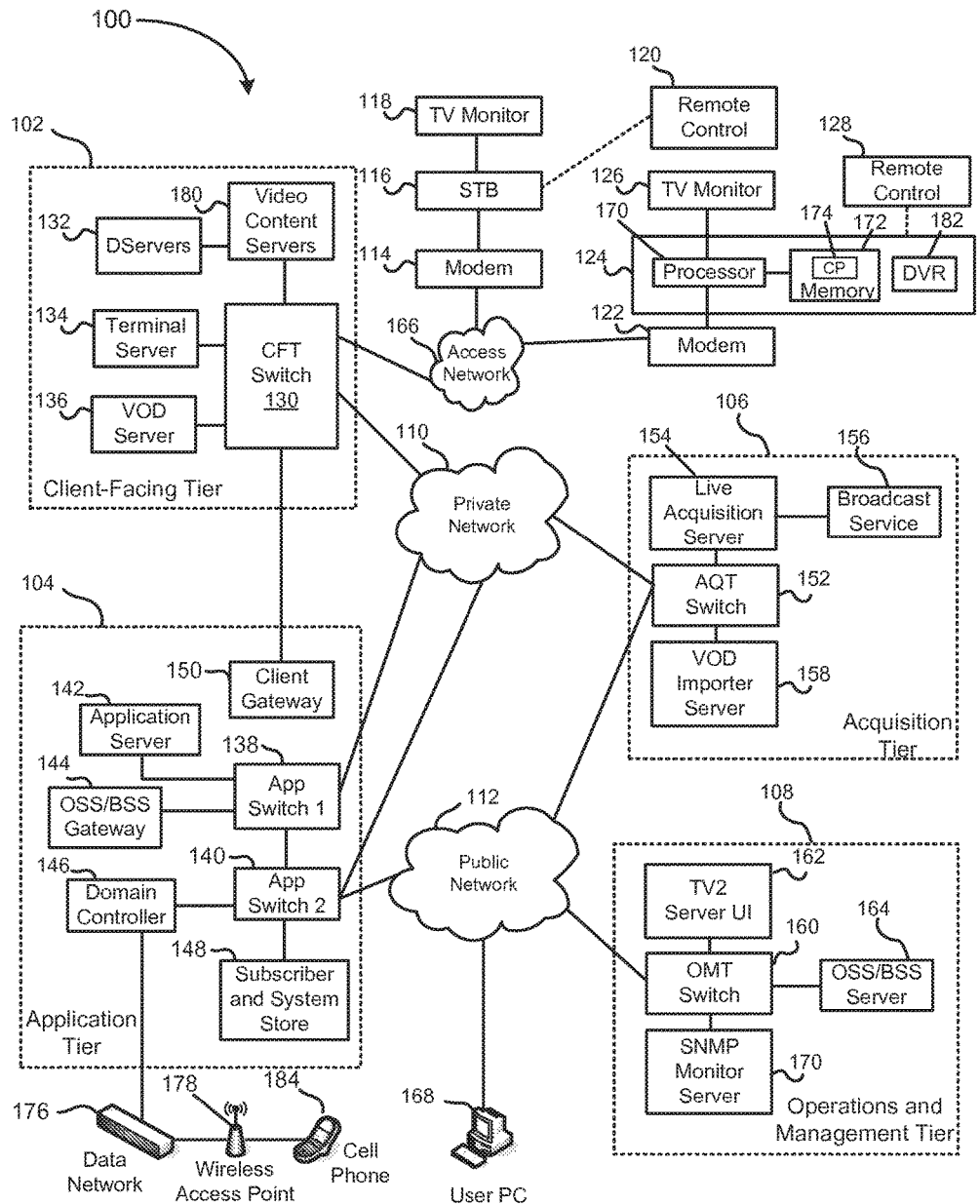
FIG. 1 is a block diagram of an Internet Protocol Television (IPTV) system.

FIG. 1 shows an IPTV system 100 including a client facing tier 102, an application tier 104, an acquisition tier 106, and an operations and management tier 108. Each tier 102, 104, 106, and 108 is coupled to one or both of a private network 110 and a public network 112. For example, the client-facing tier 102 can be coupled to the private network 110, while the application tier 104 can be coupled to the private network 110 and to the public network 112 such as the Internet. The acquisition tier 106 can also be coupled to the private network 110 and to the public network 112. Moreover, the operations and management tier 108 can be coupled to the public network 112.

The various tiers 102, 104, 106, and 108 communicate with each other via the private network 110 and the public network 112. For instance, the client-facing tier 102 can communicate with the application tier 104 and the acquisition tier 106 via the private network 110. The application tier 104 can also communicate with the acquisition tier 106 via the private network 110. Further, the application tier 104 can communicate with the acquisition tier 106 and the operations and management tier 108 via the public network 112. Moreover, the acquisition tier 106 can communicate with the operations and management tier 108 via the public network 112. In a particular embodiment, elements of the application tier 104 can communicate directly with the client-facing tier 102.

The client-facing tier 102 can communicate with user equipment via a private access network 166, such as an Internet Protocol Television (IPTV) network. In an illustrative embodiment, modems or home gateways such as a first modem 114 and a second modem 122 can be coupled to the private access network 166. The client-facing tier 102 can communicate with a first representative set-top box device 116 via the first modem 114 and with a second representative set-top box device 124 via the second modem 122. The client-facing tier 102 can communicate with a large number of set-top boxes over a wide geographic area, such as a regional area, a metropolitan area, a viewing area, or any other suitable geographic area that can be supported by networking the client-facing tier 102 to numerous set-top box devices. In one embodiment, the client-facing tier 102 can be coupled to the modems 114 and 122 via fiber optic cables. Alternatively, the modems 114 and 122 can be digital subscriber line (DSL) modems that are coupled to one or more network nodes via twisted pairs, and the client-facing tier 102 can be coupled to the network nodes via fiber-optic cables. Alternatively, the modems 114 and 122 can be cable modems that are coupled to one or more network nodes via coaxial cables, and the client-facing tier 102 can be coupled to the network nodes via fiber-optic cables. Each set-top box device 116 and 124 can process data received from the private access network 166 via an IPTV software platform such as Microsoft™ TV IPTV Edition.

The first set-top box device 116 can be coupled to a first display device 118, such as a first television monitor, and the second set-top box device 124 can be coupled to a second display device 126, such as a second television monitor. Moreover, the first set-top box device 116 can communicate with a first remote control 120, and the second set-top box device 124 can communicate with a second remote control 128. In an exemplary, non-limiting embodiment, each set-top box device 116 and 124 can receive data or video from the client-facing tier 102 via the private access network 166 and render or display the data or video at the display device 118 or 126 to which it is coupled. The set-top box devices 116 and 124 thus may include tuners that receive and decode television programming information for transmission to the display devices 118 and 126. Further, the set-top box devices 116 and 124 can include a set-top box processor 170 and a set-top box memory device 172 that is accessible to the set-top box processor. In a particular embodiment, the set-top box devices 116 and 124 can also communicate commands received from the remote controls 120 and 128 back to the client-facing tier 102 via the private access network 166.

In an illustrative embodiment, the client-facing tier 102 can include a client-facing tier (CFT) switch 130 that manages communication between the client-facing tier 102 and the private access network 166 and between the client-facing tier 102 and the private network 110. As shown, the CFT switch 130 is coupled to one or more data servers 132 that store data transmitted in response to user requests, such as video-on-demand material. The CFT switch 130 can also be coupled to a terminal server 134 that provides terminal devices, such as a game application server and other devices with a common connection point to the private network 110. In a particular embodiment, the CFT switch 130 can also be coupled to a video-on-demand (VOD) server 136.

The application tier 104 can communicate with both the private network 110 and the public network 112. In this embodiment, the application tier 104 can include a first application tier (APP) switch 138 and a second APP switch 140. In a particular embodiment, the first APP switch 138 can be coupled to the second APP switch 140. The first APP switch 138 can be coupled to an application server 142 and to an operation systems and support/billing systems and support (OSS/BSS) gateway 144. The application server 142 provides applications to the set-top box devices 116 and 124 via the private access network 166, so the set-top box devices 116 and 124 can provide functions such as display, messaging, processing of IPTV data and VOD material. In a particular embodiment, the OSS/BSS gateway 144 includes OSS data, as well as BSS data.

The second APP switch 140 can be coupled to a domain controller 146 that provides web access, for example, to users via the public network 112. The second APP switch 140 can be coupled to a subscriber and system store 148 that includes account information, such as account information that is associated with users who access the system 100 via the private network 110 or the public network 112. In a particular embodiment, the application tier 104 can also include a client gateway 150 that communicates data directly to the client-facing tier 102. In this embodiment, the client gateway 150 can be coupled directly to the CFT switch 130. The client gateway 150 can provide user access to the private network 110 and the tiers coupled thereto.

In a particular embodiment, the set-top box devices 116 and 124 can access the system via the private access network 166 using information received from the client gateway 150. The private access network 166 provides security for the private network 110. User devices can access the client gateway 150 via the private access network 166, and the client gateway 150 can allow such devices to access the private network 110 once the devices are authenticated or verified. Similarly, the client gateway 150 can prevent unauthorized devices, such as hacker computers or stolen set-top box devices, from accessing the private network 110 by denying access to these devices beyond the private access network 166.

For example, when the set-top box device 116 accesses the system 100 via the private access network 166, the client gateway 150 can verify subscriber information by communicating with the subscriber and system store 148 via the private network 110, the first APP switch 138 and the second APP switch 140. Further, the client gateway 150 can verify billing information and status by communicating with the OSS/BSS gateway 144 via the private network 110 and the first APP switch 138. The OSS/BSS gateway 144 can transmit a query across the first APP switch 138, to the second APP switch 140, and the second APP switch 140 can communicate the query across the public network 112 to the OSS/BSS server 164. After the client gateway 150 confirms subscriber and/or billing information, the client gateway 150 can allow the first set-top box device 116 access to IPTV content and VOD content. If the client gateway 150 cannot verify subscriber information for the first set-top box device 116, such as because it is connected to a different twisted pair, the client gateway 150 can deny transmissions to and from the first set-top box device 116 beyond the private access network 166.

The acquisition tier 106 includes an acquisition tier (AQT) switch 152 that communicates with the private network 110. The AQT switch 152 can also communicate with the operations and management tier 108 via the public network 112. In a particular embodiment, the AQT switch 152 can be coupled to a live acquisition server 154 that receives television content, for example, from a broadcast service 156. Further, the AQT switch can be coupled to a video-on-demand importer server 158 that stores television content received at the acquisition tier 106 and communicate the stored content to the client-facing tier 102 via the private network 110.

The operations and management tier 108 can include an operations and management tier (OMT) switch 160 that conducts communication between the operations and management tier 108 and the public network 112. In the illustrated embodiment, the OMT switch 160 is coupled to a TV2 server 162. Additionally, the OMT switch 160 can be coupled to an OSS/BSS server 164 and to a simple network management protocol (SNMP) monitor 166 that monitors network devices. In a particular embodiment, the OMT switch 160 can communicate with the AQT switch 152 via the public network 112.

In a particular embodiment during operation of the IPTV system, the live acquisition server 154 can acquire television content from the broadcast service 156. The live acquisition server 154 in turn can transmit the television content to the AQT switch 152 and the AQT switch can transmit the television content to the CFT switch 130 via the private network 110. Further, the television content can be encoded at the D-servers 132, and the CFT switch 130 can communicate the television content to the modems 114 and 122 via the private access network 166. The set-top box devices 116 and 124 can receive the television content from the modems 114 and 122, decode the television content, and transmit the content to the display devices 118 and 126 according to commands from the remote control devices 120 and 128.

Additionally, at the acquisition tier 106, the VOD importer server 158 can receive content from one or more VOD sources outside the IPTV system 100, such as movie studios and programmers of non-live content. The VOD importer server 158 can transmit the VOD content to the AQT switch 152, and the AQT switch 152 in turn can communicate the material to the CFT switch 130 via the private network 110. The VOD content can be stored at one or more servers, such as the VOD server 136.

When a user issues a request for VOD content to the set-top box device 116 or 124, the request can be transmitted over the private access network 166 to the VOD server 136 via the CFT switch 130. Upon receiving such a request, the VOD server 136 can retrieve requested VOD content and transmit the content to the set-top box device 116 or 124 across the private access network 166 via the CFT switch 130. In an illustrative embodiment, the live acquisition server 154 can transmit the television content to the AQT switch 152, and the AQT switch 152 in turn can transmit the television content to the OMT switch 160 via the public network 112. In this embodiment, the OMT switch 160 can transmit the television content to the TV2 server 162 for display to users accessing the user interface at the TV2 server. For example, a user can access the TV2 server 162 using a personal computer (PC) 168 coupled to the public network 112.

The domain controller 146 communicates with the public network 112 via the second APP switch 140. Additionally, the domain controller 146 can communicate via the public network 112 with the PC 168. For example, the domain controller 146 can display a web portal via the public network 112 and allow users to access the web portal using the PC 168. Further, in an illustrative embodiment, the domain controller 146 can communicate with at least one wireless network access point 178 over a data network 176. In this embodiment, each wireless network access point 178 can communicate with user wireless devices such as a cellular telephone 184.

In a particular embodiment, the set-top box devices can include a set-top box computer program 174 that is embedded within the set-top box memory device 172. The set-top box computer program 174 can contain instructions to receive and execute at least one user television viewing preference that a user has entered by accessing an Internet user account via the domain controller 146. For example, the user can use the PC 168 to access a web portal maintained by the domain controller 146 via the Internet. The domain controller 146 can query the subscriber and system store 148 via the private network 110 for account information associated with the user. In a particular embodiment, the account information can associate the user's Internet account with the second set-top box device 124. For instance, in an illustrative embodiment, the account information can relate the user's account to the second set-top box device 124 by associating the user account with an IP address of the second set-top box device, with data relating to one or more twisted pairs connected with the second set-top box device, with data related to one or more fiber optic cables connected with the second set-top box device, with an alphanumeric identifier of the second set-top box device, with any other data that is suitable for associating second set-top box device with a user account, or with any combination of these.

Figure 2:
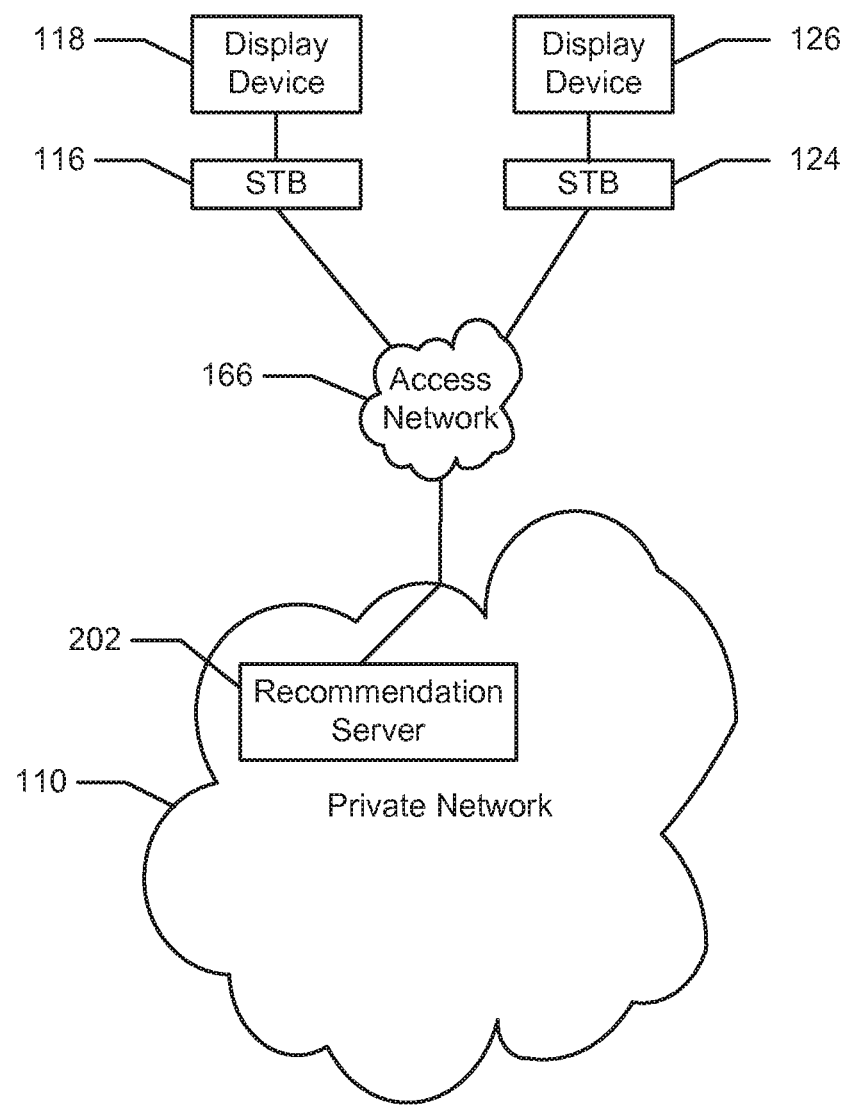
FIG. 2 is a block diagram of a portion of the IPTV system.

FIG. 2 shows a portion of the IPTV system 100 including a recommendation server 202, the set-top box devices 116 and 124, and the display devices 118 and 126. The recommendation server 202 is preferably located within an IPTV provider network, such as the private network 110. The recommendation server 202 is in communication with the set-top box devices 116 and 124 via the access network 166. The set-top box device 116 is in communication with the display device 118, and the set-top box device 124 is in communication with the display device 126.

Figure 3:
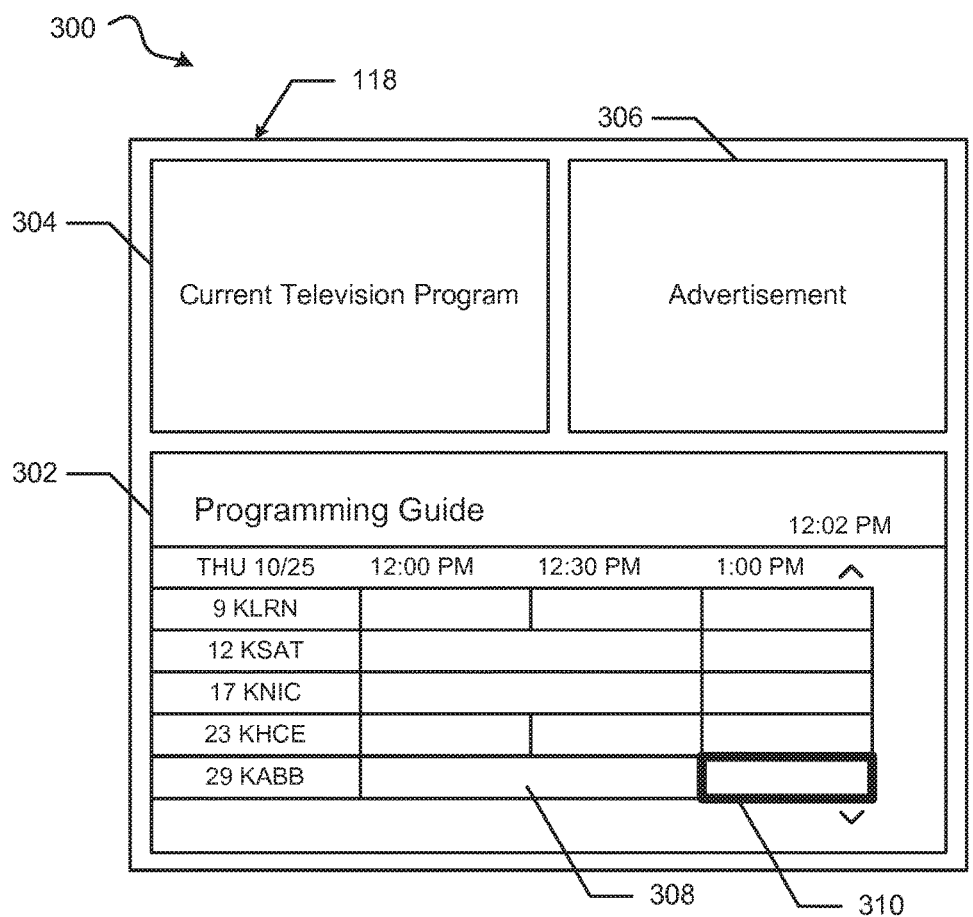
FIG. 3 is an exemplary screen shot of an electronic programming guide.

The set-top box device 116 can output an IPTV signal to the display device 118, so that the user can view a television program provided by the IPTV system 100. While the user is viewing a television program, he can utilize the set-top box device 116 to request an electronic programming guide (EPG) 302, as shown in FIG. 3. The set-top box device 116 can receive a signal representing the EPG 302 from the live acquisition server 154, of FIG. 1, via the private network 110 and the access network 166. The set-top box device 116 can then output the EPG 302 to the display device 118.

FIG. 3 shows an exemplary screen shot of the EPG 302 including a current television program 304, an advertisement 306, and television programs 308. The EPG 302 can display the current television program 304 being watched by a user so that the user can continue to watch the current television program while he scrolls through the television programs 308 listed in the EPG. The EPG 302 can also display the advertisement 306 to the user. The television programs 308 listed in the EPG 302 can be television programs currently available for viewing, television programs that will be available at future times, and/or television programs that were already available. The user can utilize the remote control 120 of FIG. 1 to highlight a television program, such as highlighted television program 310. When a television program is highlighted, the user can then select the highlighted program 310 by pressing a specific button on the remote control 120, such as a recommendation button, a select button, an enter button, and the like.

Figure 4:
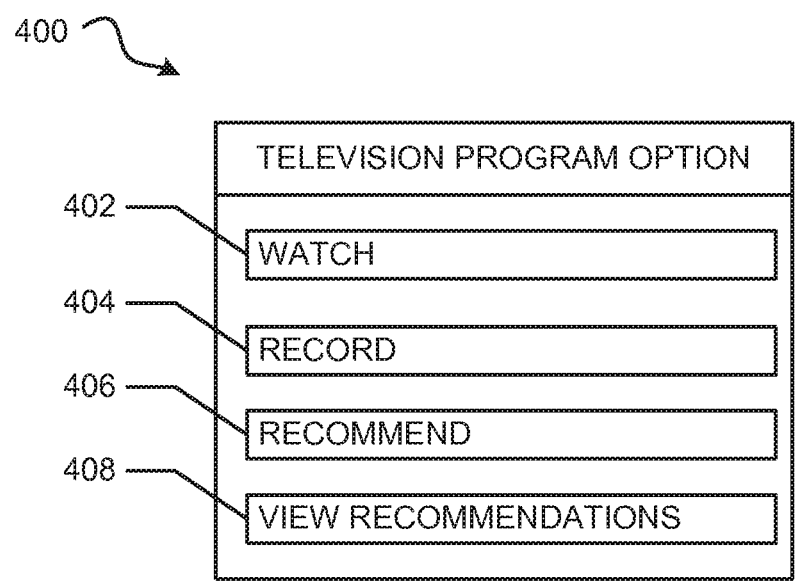
FIG. 4 is an exemplary screen shot of a television program options graphical user interface.

When the highlighted program 310 is selected, the set-top box device 116 can display a television program option graphical user interface (GUI) 400, shown in FIG. 4, including different options for handling the selection of the highlighted program 310. The television program option GUI 400 can include a watch soft button 402, a record soft button 404, a recommend soft button 406, a view recommendations soft button 408, and the like. The user can then select the recommend soft button 406, and the set-top box device 116 can send a rating/recommendation request signal to the recommendation server 202. In response to the rating/recommendation request signal, the recommendation server 202 can send a signal representing a recommendation GUI to the set-top box device 116, which in turn can output the signal to the display device 118. The display device 118 can then output the signal as a recommendation GUI 500, as shown in FIG. 5.

Figure 5:
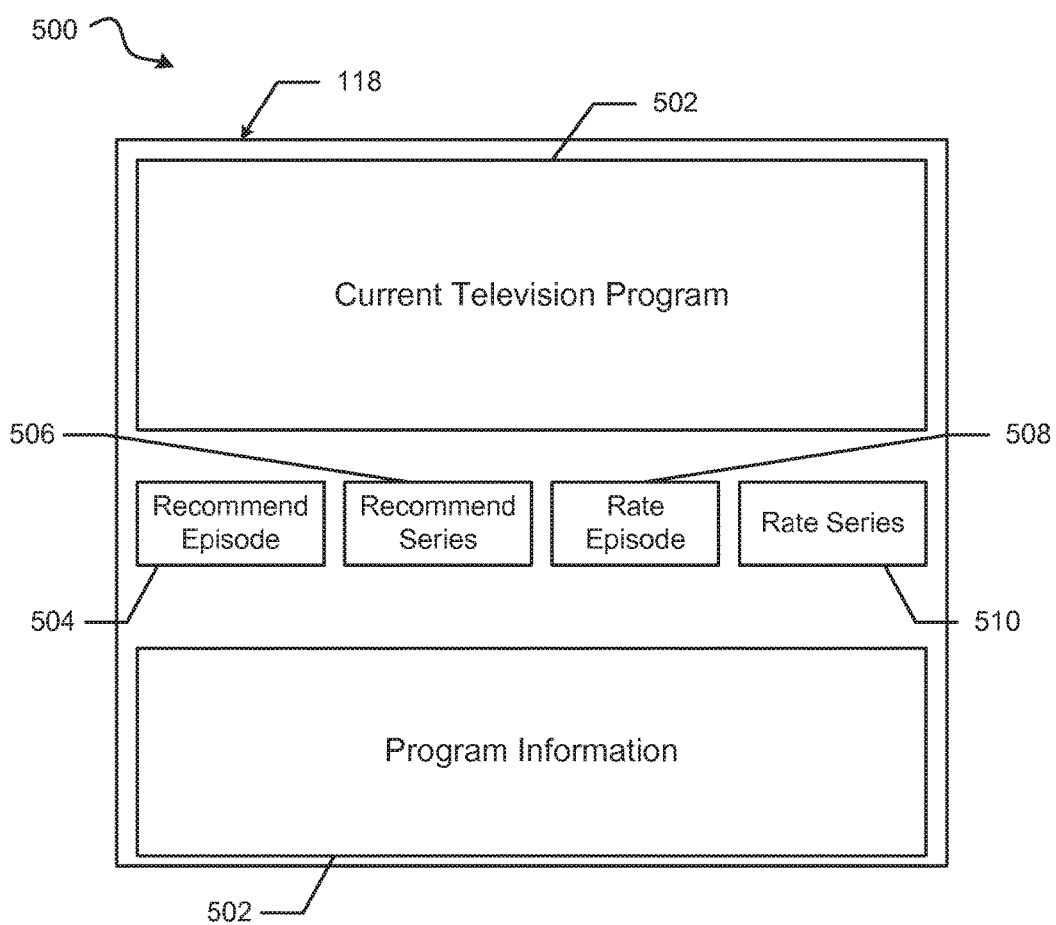
FIG. 5 is an exemplary screen shot of a recommendation graphical user interface.

FIG. 5 shows an exemplary screen shot of the recommendation GUI 500 including program information 502, a recommend episode soft button 504, a recommend series soft button 506, a rate episode soft button 508, and a rate series soft button 510. The user can read the program information 502 for the highlighted television program 310 in the recommendation GUI 500. The user can also select one of the soft buttons 504, 506, 508, or 510 to rate or recommend either the individual television program episode or an entire series associated with the television program. If the user selects the recommend episode soft button 504 or the recommend series soft button 506, the set-top box device 116 can send a signal representing the recommendation of the episode or series to the recommendation server 202, which in turn can store the recommendation in a memory for later reference.

In response to the recommendation received from the set-top box device 116, the recommendation server 202 can determine other television programs that the user may also want to recommend. The other television programs can be determined based on the genre of the television program currently recommended by the user, the viewing habits of the user, the actors in the television program currently recommended by the user, and the like. Thus, the recommendation server 202 can provide a signal representing a recommendation GUI for another television program to the set-top box device 116, which in turn can output the signal as the recommendation GUI 500 on the display device 118. The recommendation GUI 500 for the new television program can include text indicating that the user may want to recommend the new television program. The user can then read the program information 502 associated with the new television program, and can decide whether to select one of the soft buttons 504, 506, 508, or 510. If the user selects one of the soft buttons 504, 506, 508, or 510, the set-top box device 116 can send a signal representing the recommendation of the episode or series to the recommendation server 202. The recommendation server 202 can group the recommendations according to the episode and/or the series.

If the user elects to rate the episode and/or series, the recommendation server 202 can provide the user with a rating GUI having multiple rating numbers. For example, the rating numbers can range from one to five, such that the number one indicates that the episode or series is least worth watching and the number five indicates that the episode or series is great and most worth the time to watch. When the user selects a rating number for the episode or series, the set-top box device 116 can send a signal representing the rating number to the recommendation server 202 for storage in a memory. Additionally, another user of the IPTV system 100, such as the user of the set-top box device 124, can submit a rating and/or recommendation for the same episode and/or series as the user of the set-top box device 116 to the recommendation server 202. The recommendation server 202 can store the rating number from each user separately, can average the rating numbers from multiple users together for a particular episode, and can store the average rating number for the particular episode in the memory. The recommendation server 202 can index all of the ratings and/or recommendations in the memory by user, episode, and/or series for later reference.

Figure 6:
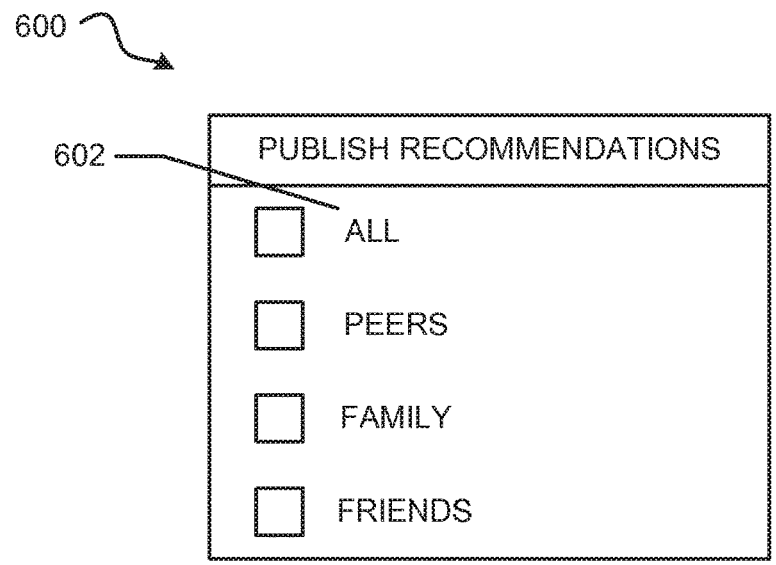
FIG. 6 is an exemplary screen shot of a publish recommendations graphical user interface.

When the user has finished making his ratings and/or recommendations for the episode or series, the recommendation server 202 can provide a signal representing a publish recommendations GUI. FIG. 6 shows an exemplary screen shot of a publish recommendations GUI 600 displayed on the display device 118. The publish recommendations GUI 600 includes a list of users 602 that the user can allow to view his ratings and/or recommendations, such as all users of the IPTV system 100, peers of the user, family of the user, and the like. The user can highlight and select users from the list of users 602 in the publish recommendations GUI 600, and the set-top box device 116 can send a signal representing the selections to the recommendation server 202 for later reference.

Figure 7:
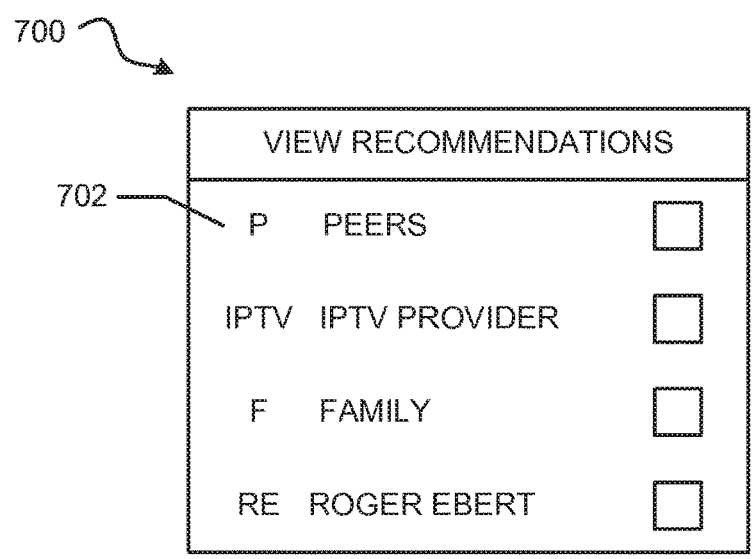
FIG. 7 is an exemplary screen shot of a view recommendations graphical user interface.

The recommendation server 202 can then provide a signal representing a view recommendations GUI 700, as shown in FIG. 7, so that the user can select other users' recommendations that he would like to view. FIG. 7 shows an exemplary screen shot of the view recommendations GUI 700 including an icon or avatar 702 associated with each of the users listed in the view recommendations GUI, such as 'P' for peers of the user, 'IPTV' for the IPTV provider, 'F' for family of the user, 'RE' for the critic Roger Ebert, and the like. The user can select one or more of the users listed in the view recommendations GUI 700 by selecting a box next to the user. The set-top box device 116 can send a signal representing the users selected from the view recommendations GUI 700 to the recommendation server 202. The recommendation server 202 can then determine whether any of the selected users have recommendations stored within the memory, and can display the icon or avatar 702 associated with the selected users that have recommendations in an EPG.

Figure 8:
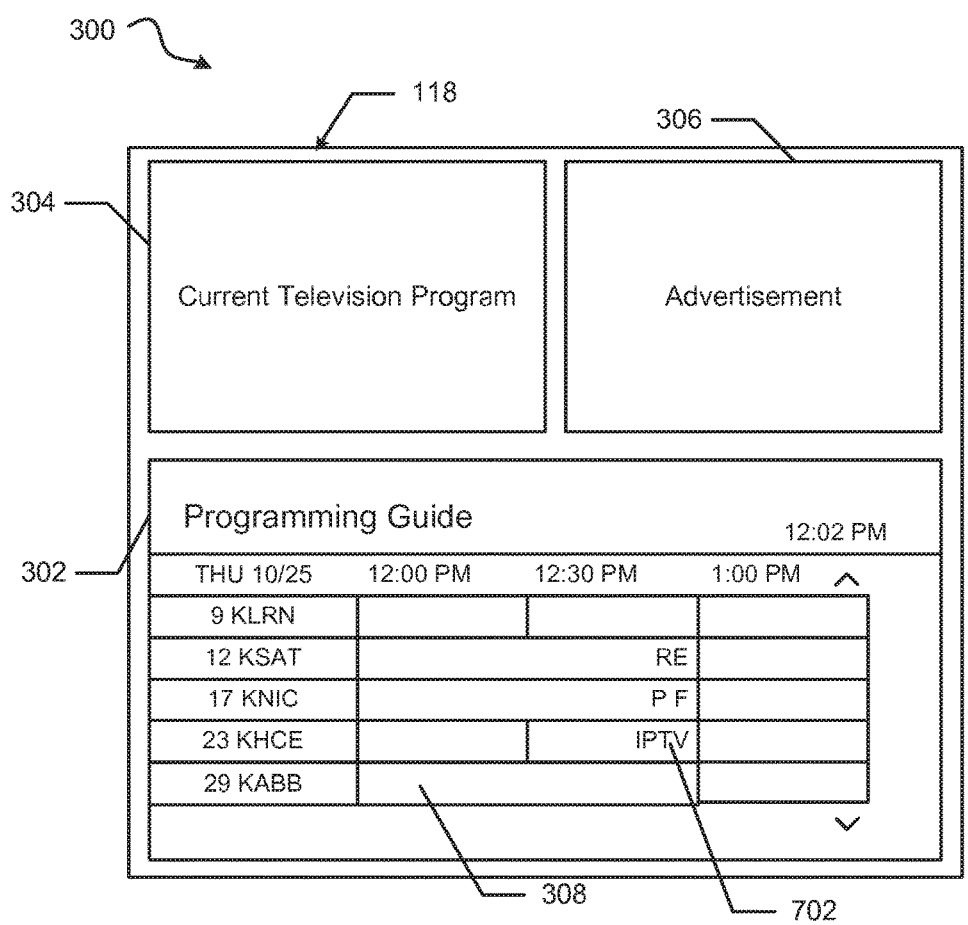
FIG. 8 is another exemplary screen shot of the electronic programming guide.

FIG. 8 shows an exemplary screen shot of the EPG 302 including the icons or avatars 702 associated with the selected users, on the EPG, next to the television programs recommended by the selected user. The recommendation server 202 can also provide an additional recommendation icon to the user, as the IPTV service provider, based on the television programs that the user typically views and/or recommends. If the user wants to view a recommendation associated with one of the television programs 308, the user can select the icon or avatar 702 displayed next to the television program on the EPG 302.

When the icon or avatar 702 is selected, the set-top box device 116 can display the television program option GUI 400, of FIG. 4, including different options for handling the selection of the television program. The user can then select the view recommendations soft button 408 associated with the television program, and the set-top box device 116 can send a view rating/recommendation request signal to the recommendation server 202. The recommendation server 202 can then transmit the rating and/or recommendation for the selected television program or series to the set-top box device 116, which in turn can output the rating and/or recommendation on the display device 118. The rating and/or recommendation can also include comments about the episode or series from the user that submitted the recommendation. The user can then decide whether to watch the television program based on the information in the rating and/or recommendation associated with the other users' recommendation icons 702 displayed next to the television program on the EPG 302.

Figure 9:
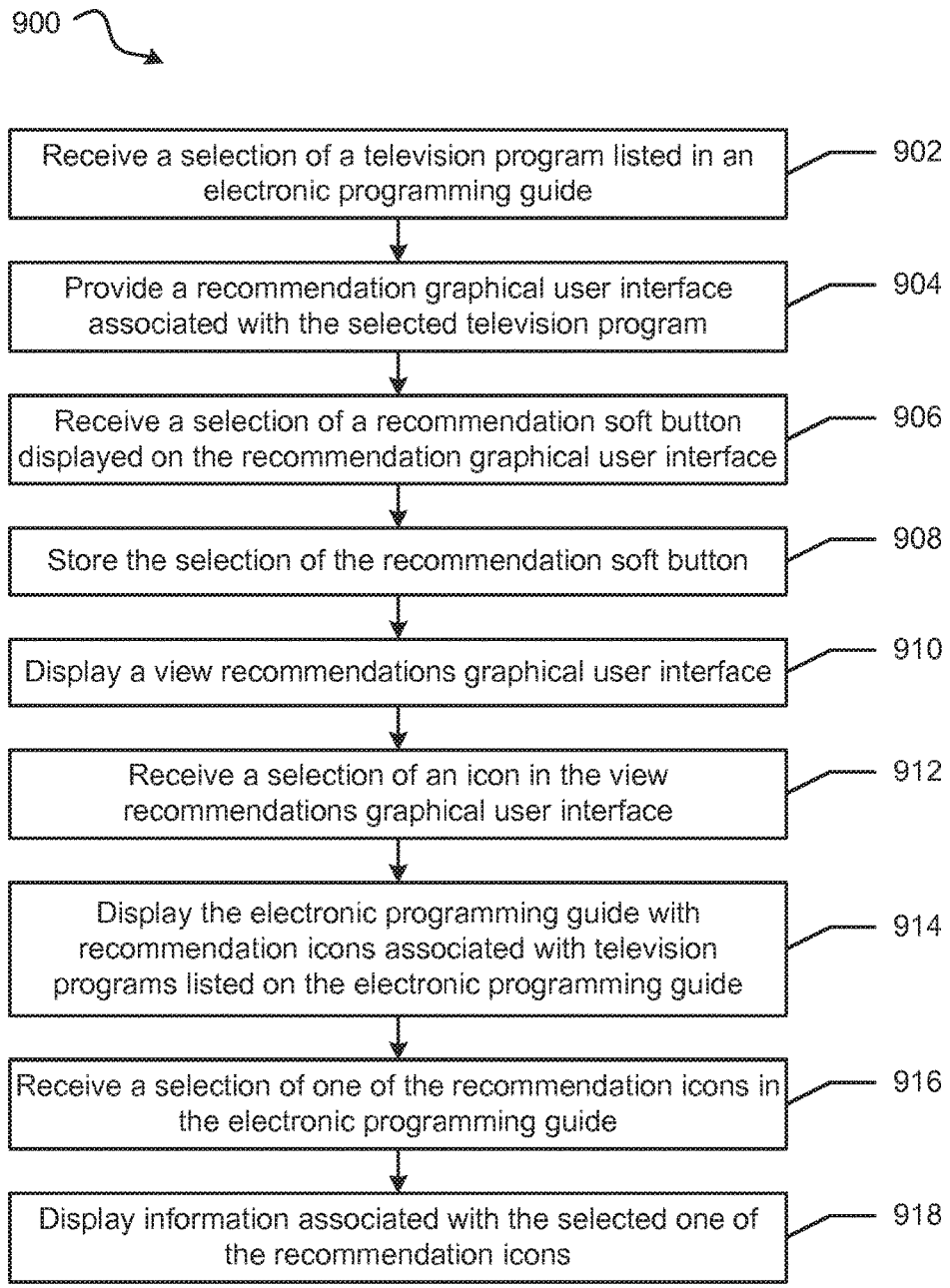
FIG. 9 is a flow diagram of a method for receiving and displaying recommendations for television programs listed in the electronic programming guide.

FIG. 9 shows a flow diagram of a method 900 for receiving and displaying recommendations for television programs listed in an EPG. At block 902, a selection of a television program listed in an EPG is received at a set-top box device. A recommendation GUI associated with the selected television program is provided to the set-top box device at block 904. The recommendation GUI can include multiple soft buttons associated with different recommendation and/or rating options for the television program. At block 906, a selection of a recommendation soft button displayed on the recommendation GUI is received. The selection of the recommendation soft button is stored at block 908.

At block 910, a view recommendations GUI is displayed. The view recommendation GUI can include multiple users that have made recommendations for different television programs. An icon or avatar can be associated with each of the users listed in the view recommendations GUI. A selection of an icon in the view recommendation GUI is received at block 912. At block 914, the EPG is displayed with recommendation icons associated with the television programs listed on the EPG. The recommendation icons can indicate that the television programs associated with the recommendation icons have a stored rating. A selection of one of the recommendation icons in the EPG is received at block 916. At block 918, information associated with the selected one of the recommendation icons is displayed. The information can include a user rating for the television program, user comments about the television program, and the like.

Figure 10:
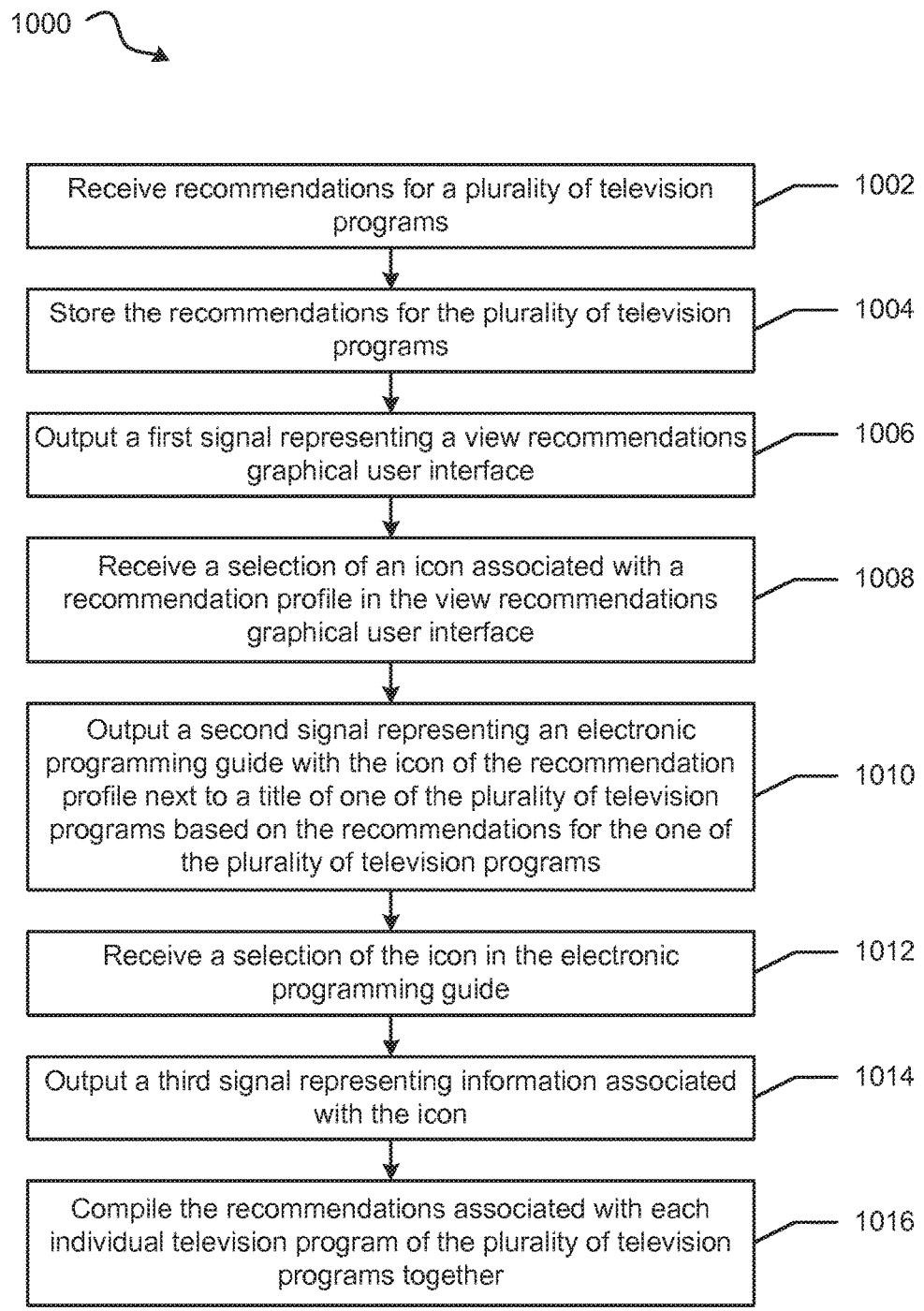
FIG. 10 is a flow diagram of alternative method for providing recommendations of television programs in the IPTV system.

FIG. 10 shows flow diagram of a method 1000 for providing recommendations of television programs in an IPTV system. At block 1002, recommendations are received for a plurality of television programs. In embodiment, the recommendation can be received at server in the backend of the IPTV system. The recommendations can include a rating number for each of the television programs, comments for each of the television programs, and the like. The recommendations for the plurality of television programs are stored at block 1004. At block 1006, a signal representing a view recommendations GUI is output. A selection of an icon associated with a recommendation profile in the view recommendations GUI is received at block 1008. The recommendation profile can be associated with an IPTV service provider, another user of the IPTV system, a television critic, and the like.

At block 1010, a signal representing an EPG is output with the icon of the recommendation profile next to a title of one of the plurality of television programs based on recommendation being associated with the one of the plurality of television programs. A selection of the icon of the recommendation profile in the EPG is received at block 1012. At block 1014, a signal representing information associated with the icon of the recommendation profile is output. The information can include a user rating for the television program, user comments about the television program, and the like. At block 1016, the recommendations associated with each individual television program of the plurality of television programs are compiled together.

Figure 11:
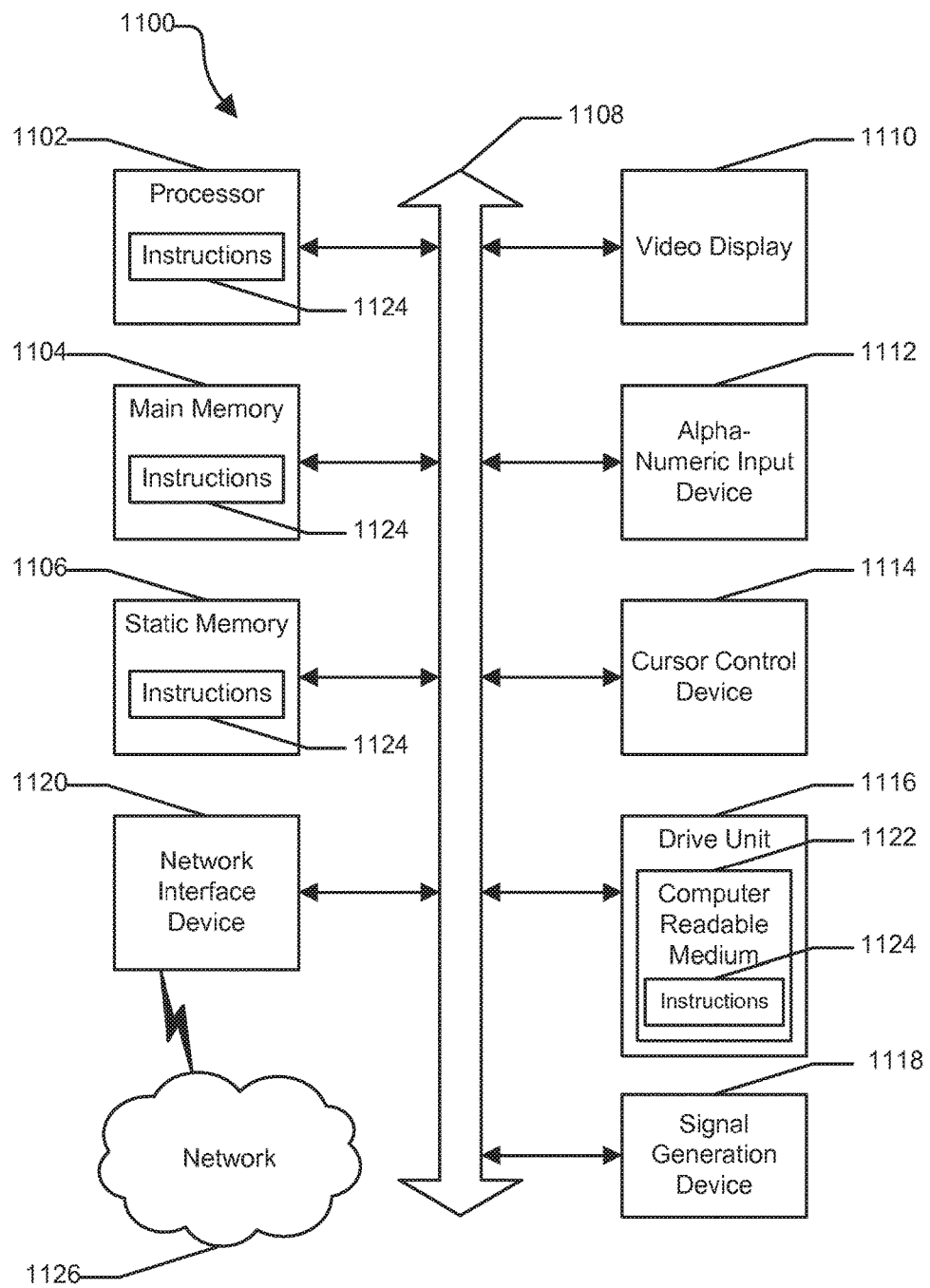
FIG. 11 is an illustrative embodiment of a general computer system.

FIG. 11 shows an illustrative embodiment of a general computer system 1100. The computer system 1100 can include a set of instructions that can be executed to cause the computer system to perform any one or more of the methods or computer based functions disclosed herein. The computer system 1100 may operate as a standalone device or may be connected, such as by using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 1100 can also be implemented as or incorporated into various devices, such as a personal computer (PC), a tablet PC, an STB, a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 1100 can be implemented using electronic devices that provide voice, video or data communication. Further, while a single computer system 1100 is illustrated, the term "system" shall also be taken to include any collection of systems or sub-systems that individually or jointly execute a set, or multiple sets, of instructions to perform one or more computer functions.

The computer system 1100 may include a processor 1102, such as a central processing unit (CPU), a graphics processing unit (GPU), or both. Moreover, the computer system 1100 can include a main memory 1104 and a static memory 1106 that can communicate with each other via a bus 1108. As shown, the computer system 1100 may further include a video display unit 1110 such as a liquid crystal display (LCD), an organic light emitting diode (OLED), a flat panel display, a solid state display, or a cathode ray tube (CRT). Additionally, the computer system 1100 may include an input device 1112 such as a keyboard, and a cursor control device 1114 such as a mouse. The computer system 1100 can also include a disk drive unit 1116, a signal generation device 1118 such as a speaker or remote control, and a network interface device 1120 to communicate with a network 1126. In a particular embodiment, the disk drive unit 1116 may include a computer-readable medium 1122 in which one or more sets of instructions 1124, such as software, can be embedded. Further, the instructions 1124 may embody one or more of the methods or logic as described herein. In a particular embodiment, the instructions 1124 may reside completely, or at least partially, within the main memory 1104, the static memory 1106, and/or within the processor 1102 during execution by the computer system 1100. The main memory 1104 and the processor 1102 also may include computer-readable media.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGS. are to be regarded as illustrative rather than restrictive.

The Abstract of the Disclosure is provided to comply with 37 C.F.R. § 1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A device comprising:
a processing system including a processor; and
a memory that stores executable instructions that, when executed by the processing system, facilitate performance of operations, the operations comprising
providing a plurality of view recommendations options to equipment of a particular user of a plurality of users, wherein a presentation of the view recommendations options by the equipment of the particular user of the plurality of users comprises a first plurality of selectable graphical user interface items based on the plurality of users of a media content access system;
receiving, from the equipment of the particular user of the plurality of users, a selection of one of the first plurality of selectable graphical user interface items corresponding to a group of recommending users of the plurality of users from which recommendations are sought, to obtain a selected group of recommending users;
identifying those users of the selected group of recommending users that have made the recommendations based on a media content item, to determine a plurality of recommending users;
receiving, from the equipment of the particular user, a selection of one of a second plurality of selectable graphical user interface items; and
responsive to the receiving of the selection of the one of the second plurality of selectable graphical user interface items:
providing information associated with the one of the second plurality of selected graphical user interface items to the equipment of the particular user for presentation, wherein the recommendation of the media content item associated with the selected graphical user interface item is provided to the equipment of the particular user for outputting at a display device.

2. The device of claim 1, wherein the second plurality of selectable graphical user interface items comprise avatars representative of the selected group of recommending users.

3. The device of claim 1, wherein the information is selected from a group consisting of a rating of the media content item and comments associated with the media content item, and wherein the media content item comprises one of a television series, an episode of the television series or both.

4. The device of claim 3, wherein the second plurality of selectable graphical user interface items comprise one of a watch soft button, a record soft button, a view recommendations soft button, and a recommend soft button, wherein the receiving of the selection of the one of the second plurality of selectable graphical user interface items comprises receiving a selection of the view recommendations soft button prior to displaying the information associated with the selected graphical user interface item.

5. The device of claim 1, wherein the second plurality of selectable graphical user interface items comprises a soft button associated with a rating number for the media content item.

6. The device of claim 1, wherein the second plurality of selectable graphical user interface items indicate availability of a stored rating corresponding to the selected group of recommending users of the plurality of users.

7. A method comprising:
providing, by a processing system including a processor, a view recommendations option to equipment of a particular user, wherein a presentation of the view recommendations option by the equipment of the particular user comprises a plurality of selectable first graphical user interface items based on a plurality of users;
receiving, by the processing system, from the equipment of the particular user of the plurality of users, an indication of a selection of one of the plurality of selectable first graphical user interface items corresponding to a selected group of users of the plurality of users from which a rating of a media content item is sought;
determining, by the processing system, those users of the selected group of users of the plurality of users that have made ratings of the media content item, to determine a plurality of recommending users;
receiving, by the processing system, from the equipment of the particular user an indication of a selection of a selectable second graphical user interface item based on the ratings of the media content item; and
providing, by the processing system, information associated with the selectable second graphical user interface item to the equipment of the particular user for presentation, wherein the selectable second graphical user interface item comprises a watch soft button, a record soft button, a view recommendations soft button, and a recommend soft button, wherein the recommendation of the media content item associated with the selectable second graphical user interface item is provided to the equipment of the particular user for outputting at a display device in response to a selection of the view recommendations soft button.

8. The method of claim 7, further comprising identifying, by the processing system, the media content item based on consumption behavior of the user, and wherein a presentation of the selectable second graphical user interface item by the equipment of the particular user is based on a recommendation profile associated with an internet protocol television provider.

9. The method of claim 8, wherein the recommendation profile indicates that the selectable second graphical user interface item associated with the media content item has a stored rating.

10. The method of claim 7, wherein the recommendations comprise authorization information of a corresponding author, indicating end users of the plurality of users that are authorized to view the recommendation.

11. The method of claim 10, wherein the recommendations comprise a group rating, and comments associated with the media content item from users of an internet protocol television system.

12. The method of claim 7, wherein the recommendation includes an authorization of a corresponding author, indicating end users of the plurality of users that are authorized to view the recommendation, the method further comprising identifying, by the processing system, whether the media content item is authorized for viewing based on the authorization and a rating number for the media content item obtained by the recommendation.

13. A non-transitory, machine-readable storage medium, comprising a plurality of executable instructions, that when executed by a processing system including a processor, facilitate performance of operations, the operations comprising:

proviiding a recommendation selector to equipment of a particular user of a plurality of users, wherein the recommendation selector comprises a plurality of selectable graphical user interface items based on a plurality of classes of users;

receiving from the equipment of the particular user of the plurality of users, a selection of a class of the plurality of classes of users from which recommendations are sought to obtain a selected class of users;

determining those users of the selected class of users that have made recommendations, to determine a plurality of recommending users of the selected class of users;

receiving a selection of a recommendation graphical user interface item associated with the plurality of recommending users of the selected class of users and a media content item; and providing information for presentation, responsive to a determination that viewing of the information has been authorized according to a list of authorized users of the plurality of users allowed to view the recommendation, wherein the recommendations of the media content item associated with the selected class of users is provided to the equipment of the particular user for outputting at a display device in response to a selection of a view recommendations soft button of the recommendation graphical user interface item.

14. The non-transitory, machine-readable storage medium of claim 13, wherein the operations further comprise:

displaying a watch soft button, a record soft button, a view recommendations soft button, and a recommend soft button; and receiving selection of the view recommendations soft button prior to displaying the information associated with the recommendation graphical user interface item.

15. The non-transitory, machine-readable storage medium of claim 13, further comprising storing the selection of the recommendation graphical user interface item, wherein the selection of the recommendation graphical user interface item corresponds to information associated with the media content item, wherein graphical user interface items are associated with an internet protocol television service provider.

16. The non-transitory, machine-readable storage medium of claim 13, wherein the information is selected from a group consisting of a rating of the media content item and comments associated with the media content item.

17. The non-transitory, machine-readable storage medium of claim 16, wherein the comments associated with the media content item are from users of an internet protocol television system.

18. The non-transitory, machine-readable storage medium of claim 13, wherein the recommendation graphical user interface item is associated with a rating number for the media content item.

19. The non-transitory, machine-readable storage medium of claim 13, wherein recommendation graphical user interface item corresponding to the media content item indicates that the media content item has a stored rating.

20. The non-transitory, machine-readable storage medium of claim 13, wherein the information associated with the selection of the recommendation graphical user interface item is limited by authorization provided by an author of the information when the information is generated.

* * * * *